United States Patent [19]

Collin

[11] 4,040,783

[45] Aug. 9, 1977

[54] METHOD OF AND AN APPARATUS FOR ANALYSIS OF THE EXHAUST GASES FROM INTERNAL COMBUSTION ENGINES

[75] Inventor: Lars Th. Collin, Molndal, Sweden

[73] Assignee: Lars Collin Consult AB, Molndal, Sweden

[22] Filed: Filed Feb. 21, 1975

[21] Appl. No.: 551,683

[30] Foreign Application Priority Data

Mar. 5, 1974 Sweden ....................................028762

[52] U.S. Cl. ...................23/232 R; 23/254 R; 23/256; 73/23; 73/116

[51] Int. Cl.[2] .....................G01 N 31/00; G01 N 33/00

[58] Field of Search .......................23/232, 232 R, 254, 23/254 R, 256; 73/23, 27 R, 116, 117, 422

[56] References Cited

UNITED STATES PATENTS

| | | | |
|---|---|---|---|
| 2,583,177 | 1/1952 | Hoekstra | 73/422 CX |
| 2,174,349 | 9/1939 | Littlefield | 23/232 R |
| 2,489,654 | 11/1949 | Main-Smith et al. | 23/254 R |
| 2,176,462 | 10/1939 | McAllister | 23/232 R |
| 3,853,477 | 12/1974 | Block et al. | 23/254 R |
| 3,622,278 | 11/1971 | Elzinga | 23/232 R |
| 3,009,786 | 11/1961 | Luckey | 23/254 R |
| 3,610,047 | 10/1971 | List et al. | 73/116 X |
| 3,866,474 | 2/1975 | Hasselmann | 23/254 R |
| 3,753,653 | 8/1973 | Brieva et al. | 23/255 E |
| 3,895,915 | 7/1975 | Haldemann | 23/254 R |

*Primary Examiner*—Morris O. Wolk
*Assistant Examiner*—Michael S. Marcus
*Attorney, Agent or Firm*—Holman & Stern

[57] ABSTRACT

A method and apparatus for analysing the emission contents of the exhaust gases from an internal combustion engine so that a given volume part of said exhaust gases is separated off and collected in an intermediate container from which a predetermined part is directed through at least two parallel gas analysis tubes, each tube containing a medium suited to indicate a certain contaminant in said gas, steps being taken to ensure equal flow through said tubes.

11 Claims, 3 Drawing Figures

METHOD OF AND AN APPARATUS FOR ANALYSIS OF THE EXHAUST GASES FROM INTERNAL COMBUSTION ENGINES

BACKGROUND OF THE INVENTION

A method and apparatus for analysing the emission contents of the exhaust gases from an internal combustion engine so that a given volume part of said exhaust gases is separated off and collected in an intermediate container from which a predetermined part is directed through at least two parallel gas analysis tubes, each tube containing a medium suited to indicate a certain contaminant in said gas, steps being taken to ensure equal flow through said tubes.

The contaminations in the form of carbon monoxide, CO, unburned hydrocarbons, HC, and nitrogen oxides, $NO_x$, commonly called the emission content and found in the exhaust gases from internal combustion engines represent an imminent danger to the surroundings, specially in towns and other territories with a considerable car density and/or in territories with unfavourable weather conditions. In this field the laws are severe and are expected to be made still more so.

However, in practice all rules soon become meaningless if there are no simple means available for enforcing said rules. The analytical methods now available are lengthy and time consuming and may generally only be used for tests, i.e., spot checks on new car types and for stray tests. In order to control a large number of cars a simple test apparatus allowing rapid immediate results and suitable for field use is necessary.

SUMMARY OF THE INVENTION

The present invention relates to a method and an apparatus meeting these requirements. The apparatus is intended to deal with a part of the exhaust gases leaving an engine during a certain period of time, which part of gases is collected in a baglike container. A device according to the invention is characterized in means allowing the separation of a given amount of the exhaust gases from an engine during a certain time and further means for feeding a predetermined amount of said separated gas amount through an apparatus provided with at least two parallel connected gas analysis tubes, each containing a substance suited to indicate or sense the presence of a special component in the exhaust gases steps being taken to ensure equal flow through said tubes.

BRIEF DESCRIPTION OF SOME PREFERRED EMBODIMENTS

Figure 1:
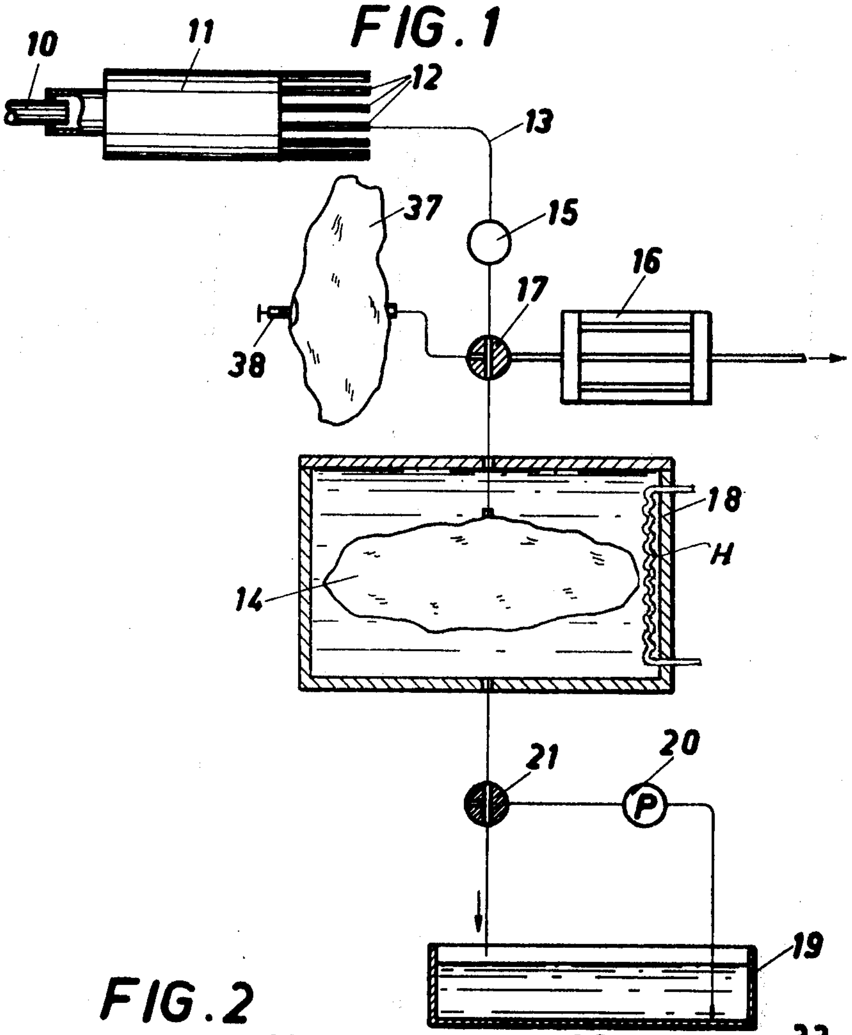
FIG. 1 very schematically shows the components of a system according to the invention.

The exhaust pipe from an engine, which may be, for example, an internal combustion, passenger car engine, is designated 10. Volume portioning device 11 will be connected to said pipe during the time (test period) of the test.

The volume portioning device 11 principally is a distribution chamber to which a number of outlet pipes 12 having the same internal flow resistance are connected. A further conduit 13 is connected to said chamber, said conduit 13 being connected with a baglike container 14, e.g., of a plastic synthetic material. The flow resistance in said conduit 13 to the bag is substantially the same as the resistance in each one of said outlet pipes 12. In said conduit a solenoid valve 15 is provided, which governs the connection between said volume portioning device 11 and said container 14 during the sampling.

It is assumed that the engine during the sampling is made to perform a predetermined test sequence involving different loads. Said test sequence is governed by a control unit, which also governs said valve 15, from which is evident that a representative portion of the gas amount generated during the test sequence, is fed through said volume portioning device 11 to said container 14.

In an earlier application, Ser. No. 439,941, filed Feb. 5, 1974, the inventor has described how such a test cycle can be arranged, one main feature being that the inertia of the engine is used for braking, so only a series of short running periods are required to build up the cycle.

The part of the testing apparatus above described forms no part of the present invention, which is concerned with a simple method of analysing the gas collected in said container 14.

Analysing units in the form of gas detecting tubes filled with chemicals are commonly available; as seen in U.S. Patents 2,176,462 to McAllister; 2,489,654 to Main-Smith et al.; or 2,174,349 to Littlefield, for example. When a gas with a certain composition is brought to pass through such a tube the chemicals change colour, or consistence and the degree of such a change is a measure of the content of a certain compound in the gas passing through the tube.

Such tubes for determining CO and $NO_x$ are easily provided. With respect to HC the situation is that there are several fractions in common exhaust gases, and therefore a representative fraction will have to be chosen. For a careful test, several fractions may have to be analysed. The nature of the hydrocarbons may vary depending upon the composition of the fuel and its origin.

The invention resides in the use of such gas analysis tubes and an essential feature according to the invention is a casing provided to receive at least two such parallel tubes. However, if desired, several tubes may of course be used, e.g., for controlling one or more fractions of HC or any other compound in the exhaust gases.

A casing for three tubes is shown in FIG. 1 at 16. A three-way valve 17 is provided in conduit 13, the valve being maintained in its open position shown during sampling. During the analysis, casing 16 is connected with said bag container 14. The nature of casing 16 and the tubes will be more closely described in connection with FIG. 2.

In order to provide transport of gas collected in the bag container 14 to the casing 16, and through the tubes therein, bag 14 is arranged in a pressure vessel 18; the vessel is connected to a source of pressure fluid comprising a receptacle 19 for fluid, e.g., oil, a pump 20, and a second three-way valve 21.

Provided that the pressure vessel 18 is filled with fluid at the beginning of the sampling and that the bag 14 is practically compressed, fluid may be let out from said vessel 18 by means of said three-way valve 21 simultaneously with the gas flowing into said bag. Thus favourable expanding conditions are provided for the bag 14, the amount of outflowing fluid being a measure of the gas volume collected.

If both three-way valves 17 and 21 are re-positioned and said pump 20 is actuated, fluid will again be supplied to said pressure vessel 18 and gas will be pressed out of bag 14 and to container 16. As will be described later the fluid pressure has a certain influence upon to the analysis.

During the sampling sequence, the amount of gas will vary from idling of the engine to full load in certain cases. In connection to said three-way valve 17, a buffer means 37 is provided, preferably in the form of an elastic bellows or a cylinder with a balanced piston in which means such gas, which may not be immediately received by bag 14, will be temporarily stored.

Said buffer means is provided with a depression valve 38. Valve 15 closes immediately at the end of the sampling sequence and it is often desirable to have a constant gas volume in said bag 14 before starting the analysis. The gas collected during the test cycle is then mixed with a measurable amount of clean air, which is sucked in through said depression valve 38.

The gas analysis device, as such, may be arranged separate from the gas collecting means. The buffer means may then be disconnected from gas conduit 13, and be transported in closed condition to said analysis device.

In such a case, the buffer means is first sucked empty, and the presence of a sufficent gas volume in bag 14 is controlled. Then the desired amount of gas is returned to the buffer means.

It is to be observed that possible moisture in the gas should not be allowed to condense in bag 14, as in such a case certain emission fractions may dissolve in the condensate, causing incorrect values in the analysis tubes. Due to the fact that a noticeable decrease of the gas volume during analysis should be avoided it is further important to avoid a cooling of the gas in the bag.

Therefore, the pressure vessel 18 should be insulated and/or provided with heating means. In such localities where hot tap water under normal water pressure is available pump 20 may be replaced by a connection to the hot water service main. The temperature of said pressure vessel should be kept at 40° to 50° C. which may be controlled by means of a thermostat.

It is evident that an electric heating element as schematically illustrated at H in FIG. 1, for example, or a radiation source may be used in connection with the pressure vessel and/or the conduits, and that air or another gas may be used instead of a fluid.

The main thing is to prevent moisture being collected in bag 14.

The capacity of the moisture for dissolving chemicals is a function of time of exposure, temperature and surface area. Instead of heating or insulating bag 14 it is possible to insert a cooled surface just downstream of portioning device 11. The gas will flow rather rapidly past said surface, so the time of exposure will be short and the condensate will be continuously drained away.

Instead of a container, such as 14, for collecting gas during the sampling and only starts to feed gas to the analysis device thereafter, a pump may of course be used, which continuously forces the gas through the analysis pipes. In this case too, it may be of importance to provide a buffer means between the exhaust pipe of the engine and the analysis device.

Figure 2:
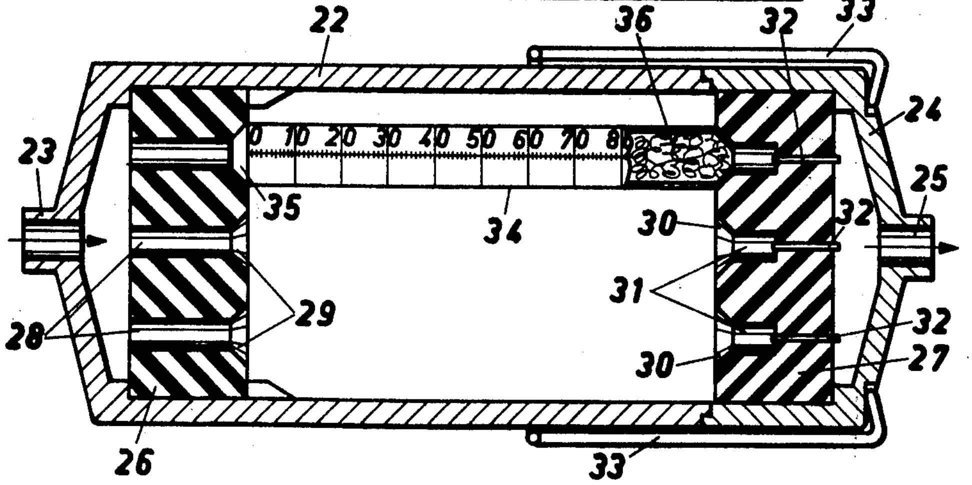
FIG. 2, on a larger scale, shows a view of a casing for the analysis tubes.

A casing for three analysis tubes is schematically shown in FIG. 2, said casing comprising a main body 22 provided with an inlet 23 and an outlet part 24 with an outlet 25.

In both of these parts there are provided blocks 26 and 27 of an elastic material. The block 26 is provided with three passages 28, each terminated by a tapering end 29.

The second block 27 is likewise provided with three similar openings 30, which however end in blind passages 31. A capillary tube 32 is pushed through the elastic material of the block to each of the passages 31. All capillary tubes shall have the same characteristic of flow, i.e., have the same resistance of flow at the same amounts of flow.

The gas analysis tubes cannot be obtained with constant flow resistance for different cases of analysis. Therefore the same resistance to flow in the three parallel tubes may not be expected. Therefore, a flow proportioning must be effected through restriction after said analysis pipes. The passing gas thus attains a relative high density and also a low volume velocity, which makes the indication easier and more rapid The gas volume passing through each of said tubes, which in this case should be about exactly one third of the total volume, should preferably escape into the atmosphere during a time period of a half minute, up to a few minutes. In order to ascertain that no spreading in the values occurs due to different resistance in said tubes the restriction in the same should amount to 90–95% of the total pressure reduction in said casing 16.

The capillary tubes may for instance comprise pieces with a length of about 30 mm., cut from one and the same tube and should be burrfree. The tubes may like injection needles be pushed through the elastic block 27. In case any tube becomes closed on insertion the tubes may be removed and new tubes, equally calibrated, be inserted without any leakage through the block occurring.

Instead of forcing the gas through the tubes, it is of course possible to suck the gas therethrough by means of a suitable apparatus creating a sub-pressure downstream of the tubes.

The container 16 will be subjected to a considerable internal pressure, 5 to 6 kp./cm.$^2$, when using tap water pressure in the pressure vessel 18. The parts of the container should be easily dismantable to facilitate a substitution of the tubes, but must nevertheless be securely pressed towards each other during the analysis.

The parts may for instance, be joined by a hinge, the axis of which is parallel to the parting line which lies somewhat behind the plane shown in the drawing. The parts may be secured by clamps 33 or the like, swingably mounted on the main body 22.

The analysis tubes 34, the principle and function of which are known in the art, are in this case made with a length adjusted to the length of the casing and are provided with conical end parts 35. The cone angle is somewhat larger than the cone angle of the opening parts 29, 39 of the blocks in order to prevent gas leakage.

Each of the analysis tubes is provided with a filter 36 at its outlet end and is graduated, for instance from 1 to 100. The tubes are preferably made visible against a background which is coloured for a certain car make and model, e.g., green/yellow/red, to indicate acceptable, doubtful or not acceptable emission amounts of the type which respective tube is intended to indicate. These markings are preferably printed on a card, which is insertable in a holder in the casing 16.

The evaluation of the test results presupposes that the engine functions properly. A leaking or stuck valve or defective ignition system will detrimentally influence the emission content. In order to check the condition of the engine its speed, or for instance the number of ignitions at one cylinder during the test cycle should be recorded and compared with a normal value.

Figure 3:
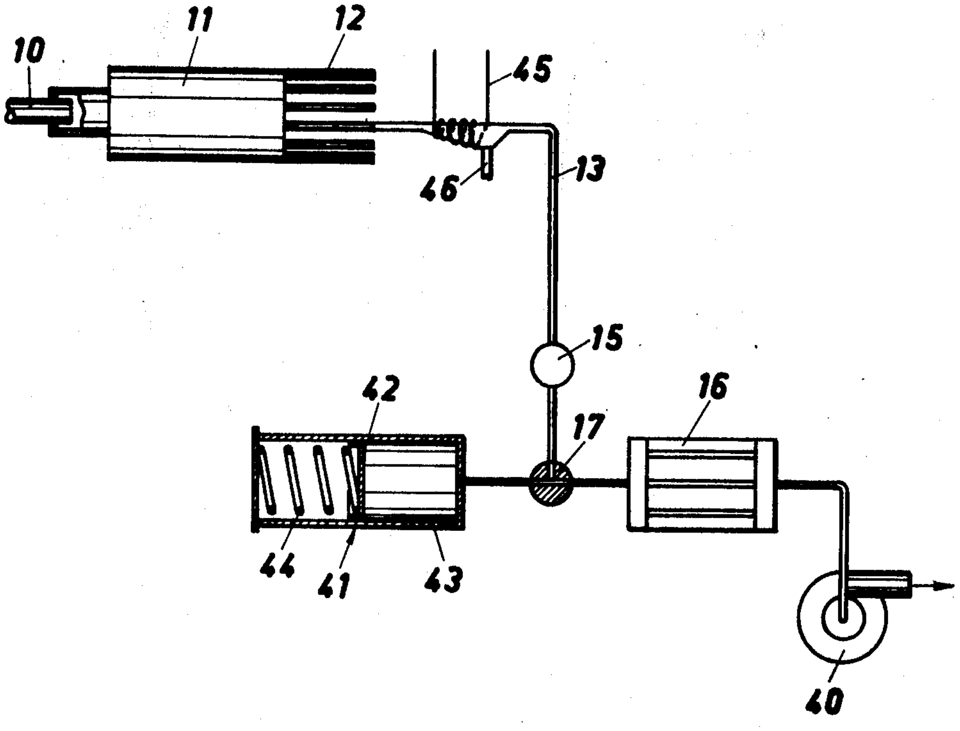
FIG. 3 shows a modified embodiment of the system similar to FIG. 1.

FIG. 3 shows a modified embodiment of the apparatus used for performing the tests, the volume proportioning device 11 having outlet pipes 12 is the same as in FIG. 1 and is connectable the exhaust pipe 10 of the car. The transfer conduit 13 is provided with a solenoid valve 15, but the gas is sucked through the analysis tubes by suitable pumping means denoted by 40.

Casing 16 is of the type described above, being provided with means to ensure equal flow through the analysis tubes therein. There is a three way valve 17 for directing the gas to the casing 16 and to a buffer means 41 or temporarily to the buffer means only.

The buffer means is here formed as a piston 42 reciprocally in a cylinder 43, and is displaceable under the influence of the gas pressure against the action of a spring 44.

In order to prevent possible moisture in the gases from influencing the test result by condensing and dissolving part of the contaminants, a portion of the connection pipe 13 just downstream of the proportioning device 11 is cooled by a coil 45 connected to a suitable source for cooling fluid. The conduit 13 is provided with a tap 46 for bleeding off the condensed moisture.

What I claim is:

1. A method of analyzing the emission-content of exhaust gases from an internal combustion engine, comprising steps of:

(a) removing a sample of exhaust gas from an internal combustion engine over a given period of time;
(b) passing the sampled gas to a storage container;
(c) buffering said sample of exhaust gas in said storage container;
(d) passing the gas from the storage container to a plurality of parallel-connected exhaust gas analyzing tubes, each tube containing different media therein capable of indicating the presence of certain compounds contained in the exhaust gas;
(e) simultaneously passing a predetermined proportional flow of the sampled exhaust gas through said plurality of analyzing tubes so that a constituent of said exhaust gas contacts the medium in the analyzing tubes for sensing the presence of the compound in the sampled gas being tested; and incorporating in each of said analyzing tubes a resistance essentially exceeding the resistance of a single tube to ensure a proportionate division of the gas flow.

2. A method according to claim 1, further including the step of maintaining the temperature of the removed gas sample to be analyzed, at a temperature to substantially eliminate condensate.

3. The method according to claim 1, further including the step of cooling the gas sample before collecting the sample in said storage container and condensing moisture therein, and removing condensate from the gas, upstream of the storage container.

4. The method according to claim 1, further including the step of providing at least three gas analyzing tubes, and providing in each of said three tubes a different chemical substance for respectively indicating CO, $NO_x$, and HC in said sample of exhaust gas.

5. Apparatus for analyzing the emission-contents of fluctuating gases issuing from the exhaust pipe of an internal combustion engine comprising, in combination:

proportioning means connected to said exhaust pipe for dividing off a sample of exhaust gas from said engine over a period of time;

buffering means connected to and communicating with said proportioning means for receiving and retaining said sampled gas to be tested;

container means having inlet means connected to and communicating with said buffering means, said container means having an outlet downstream of said inlet, at least two gas analysis tubes in parallel communication between said inlet and outlet, said gas analysis tubes each containing media therein capable of indicating the presence of certain compounds contained in the gas passed therethrough, restriction means in said container and at the outlet end of each said gas analysis tube, providing each of said tubes with an outlet resistance exceeding the resistance of a single tube for ensuring a proportionate division of gas flow through the respective tubes; and flow control means connected to said proportioning means, said buffering means, and said container means for conducting said sampled gas therebetween.

6. Apparatus as set forth in claim 5, in which said resistance means comprises a capillary passage portion communicating with said tubes at said outlet for providing each of said tubes with a resistance essentially exceeding the resistance of a single tube, said container including removable elements transversely of said container inlet and outlet, respectively, said removable elements including elastic portions conforming to and sealingly engaging respective ends of the analysis tubes, said capillary passage portions being in the removable element at the outlet end of said gas analysis tubes.

7. The apparatus as claimed in claim 5, further including cooling means connected between said proportioning means and said buffering means for cooling the divided-sample of gas to condense moisture contained in said sample prior to said sample entering the gas analysis tubes.

8. The apparatus as claimed in claim 5, including means for feeding the gas to said gas analysis tubes, said last mention means comprising a pump connected to the outlet of said container means.

9. The apparatus as claimed in claim 5, in which said container means includes means for receiving a card indicating the tolerable amount of the compound of interest as a background for each of said tubes.

10. The apparatus as claimed in claim 5, wherein said tubes are terminally tapered, said container including removable elastic elements adjacent said inlet and outlet and respectively including socket portions conforming to the terminal ends of said gas analysis tubes and removably mounting the tubes therein.

11. The apparatus as claimed in claim 10, in which said socket portions receiving the tubes at the outlet end of said container, terminate in calibrated outlet nozzles, said nozzles being capillary tubes extending through said removable element and communicating with the socket portions therein.

* * * * *